(12) United States Patent
Tsuchiya (10) Patent No.: US 12,508,757 B2
(45) Date of Patent: Dec. 30, 2025

(54) METHOD AND DEVICE FOR MANUFACTURING CONTAINER MADE OF BIODEGRADABLE RESIN

(71) Applicant: NISSEI ASB MACHINE CO., LTD., Nagano (JP)

(72) Inventor: Yoichi Tsuchiya, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 367 days.

(21) Appl. No.: 17/633,721

(22) PCT Filed: Aug. 7, 2020

(86) PCT No.: PCT/JP2020/030411
§ 371 (c)(1),
(2) Date: Feb. 8, 2022

(87) PCT Pub. No.: WO2021/029372
PCT Pub. Date: Feb. 18, 2021

(65) Prior Publication Data
US 2022/0324147 A1 Oct. 13, 2022

(30) Foreign Application Priority Data

Aug. 9, 2019 (JP) .................................. 2019-147419

(51) Int. Cl.
*B29C 45/73* (2006.01)
*B29C 45/00* (2006.01)
(Continued)

(52) U.S. Cl.
CPC .......... *B29C 45/73* (2013.01); *B29C 45/0001* (2013.01); *B29C 49/0005* (2013.01); *B29C 49/64* (2013.01); *B29C 49/64195* (2022.05)

(58) Field of Classification Search
CPC ................ B29C 45/73; B29C 45/0001; B29C 2049/023; B29C 2049/4825;
(Continued)

(56) References Cited

U.S. PATENT DOCUMENTS 4,164,298 A * 8/1979 Nishikawa .......... B29C 49/6454
426/106
5,658,627 A 8/1997 Fujimaki et al.
(Continued)

FOREIGN PATENT DOCUMENTS

CN 102470601 A 5/2012
JP 04-065216 3/1992
(Continued)

OTHER PUBLICATIONS

Office Action issued May 8, 2023 in Chinese family member application No. 202080062850.8, and English language translation thereof.
(Continued)

*Primary Examiner* — Galen H Hauth
*Assistant Examiner* — Mohamed K Ahmed Ali
(74) *Attorney, Agent, or Firm* — Greenblum & Bernstein, P.L.C.

(57) ABSTRACT

A manufacturing method for manufacturing a biodegradable resin container includes at least: an injection molding process of injection molding a preform made of a biodegradable resin in an injection molding mold; a temperature adjustment process of adjusting a temperature of the preform in a temperature adjustment mold; and a blow molding process of manufacturing a container by blow molding the preform after temperature adjustment in a blow mold, in which a temperature of the injection molding mold is set to 40° C. or lower.

10 Claims, 5 Drawing Sheets

(51) Int. Cl.
*B29C 49/00* (2006.01)
*B29C 49/64* (2006.01)

(58) Field of Classification Search
CPC .......... B29C 49/0005; B29C 49/64195; B29C 49/6409; B29C 49/06
See application file for complete search history.

(56) References Cited

U.S. PATENT DOCUMENTS

| | | | |
|---|---|---|---|
| 2007/0027247 A1* | 2/2007 | Ueda | C08K 5/1515 524/445 |
| 2009/0174124 A1* | 7/2009 | Maeda | B29C 49/78 264/532 |
| 2010/0140280 A1* | 6/2010 | Burke | B65D 1/0223 220/660 |
| 2011/0001275 A1 | 1/2011 | Hatakeyama et al. | |
| 2012/0132608 A1 | 5/2012 | Aoki et al. | |
| 2014/0131920 A1 | 5/2014 | Nakahara | |
| 2014/0190924 A1 | 7/2014 | Aoki et al. | |
| 2016/0361860 A1 | 12/2016 | Nakahara | |

FOREIGN PATENT DOCUMENTS

| | | | |
|---|---|---|---|
| JP | 6-305002 A | | 11/1994 |
| JP | 6-315973 A | | 11/1994 |
| JP | 7-40429 | | 2/1995 |
| JP | 8-058796 A | | 3/1996 |
| JP | 8-109325 | | 4/1996 |
| JP | 11-34152 A | | 2/1999 |
| JP | H1134152 A | * | 2/1999 |
| JP | 2001354223 A | * | 12/2001 |
| JP | 2007-1187 A | | 1/2007 |
| JP | 2007001187 A | * | 1/2007 |
| JP | 2007-83599 A | | 4/2007 |
| JP | 2007083599 A | * | 4/2007 |
| JP | 2012-245753 A | | 12/2012 |
| JP | 5239479 | | 7/2013 |
| JP | 5439692 B2 | | 3/2014 |
| WO | 2013/012067 A1 | | 1/2013 |

OTHER PUBLICATIONS

Plastic Processing Technology, Harbin Institute of Technology Press, pp. 244-245, Jun. 2013.

International Search Report and Written Opinion of the International Searching Authority issued in International Patent Application No. PCT/JP2020/030411, dated Sep. 1, 2020, along with an English translation thereof.

Office Action issued in corresponding Indian Patent Application No. 202227006920 dated Jun. 28, 2022, along with English translation thereof.

Supplementary European Search Report issued Dec. 14, 2023 in European family member application No. 20852288.8.

Office Action issued in Corresponding JP Patent Application No. 2021-539280, dated Sep. 17, 2024, along with an English translation thereof.

* cited by examiner

METHOD AND DEVICE FOR MANUFACTURING CONTAINER MADE OF BIODEGRADABLE RESIN

TECHNICAL FIELD

The present invention relates to a manufacturing method for manufacturing a biodegradable resin container in a hot parison type blow molding apparatus, and more specifically, to a manufacturing method for manufacturing a biodegradable resin container and a manufacturing apparatus for manufacturing the same in which a preform can be easily demolded from an injection molding mold and a temperature can be adjusted such that the preform is not torn off during blow molding.

BACKGROUND ART

A plastic (synthetic resin) is used in a large amount in many fields such as a resin container, and causes serious environmental problems such as landscape inhibition, adverse effects on marine organisms, and contamination of a global environment by these waste materials, and measures against the environmental problems become an urgent need. Examples of the measures include (1) a reduction in a use amount and a waste amount of a material of a non-biodegradable resin (non-biodegradable plastic: polyethylene, polypropylene, polyvinyl chloride, polyethylene terephthalate, or the like), reuse of an article manufactured from the material, and promotion of recycle reproduction of a waste material thereof, or (2) expanding use of a biodegradable resin (biodegradable plastic). Regarding the expanding of the use of the biodegradable resin of (2), in a field of manufacturing the resin container, it is conceivable to change a material of a container from the non-biodegradable resin in the related art to the biodegradable resin. (See, for example, Patent Literature 1)

As a hot parison type blow molding apparatus for manufacturing a container of a non-biodegradable resin (hereinafter, simply referred to as a "normal resin") in the related art, there is known a blow molding apparatus including an injection molding part that injection molds a preform, a temperature adjustment part that adjusts a temperature of the preform molded by the injection molding part, and a blow molding part that blow molds the preform in which the temperature is adjusted (see, for example, Patent Literature 2). A reason for providing the temperature adjustment part is that the preform that is just molded by the injection molding part does not have a temperature distribution suitable for blow molding, and therefore the temperature adjustment part adjusts the temperature of the preform to a temperature suitable for the blow molding.

As the temperature adjustment part for adjusting the temperature more appropriately and in a short period of time to the temperature suitable for the blow molding, there is proposed the blow molding apparatus that performs the blow molding after adjusting the preform so as to have an appropriate temperature distribution between an insertion core (a temperature adjustment core or a heating core) and a pot member (a temperature adjustment pot mold or a heating pot mold) (see, for example, Patent Literature 3).

CITATION LIST

Patent Literature

Patent Literature 1: Japanese Patent No. 5439692
Patent Literature 2: JP-A-H06-315973
Patent Literature 3: WO 2013/012067

SUMMARY OF INVENTION

Technical Problem

However, there is the following problem when the container of a biodegradable resin is to be manufactured by the blow molding apparatus in the related art. The biodegradable resin is generally worse in moldability as compared with the normal resin. Therefore, a technique capable of satisfactorily manufacturing a medium-sized to large-sized (capacity of 500 ml or more) container made of 100% biodegradable resin by a stretch blow molding method (in particular, an injection stretch blow molding method: a hot parison type blow molding method) is hardly established. In addition, since a material cost of the biodegradable resin is several times more expensive than a resin material usually used in the blow molding (normal resin material: polyethylene, polypropylene, polyethylene terephthalate, or the like), in a case where the container cannot be stably manufactured, unnecessary material cost may be incurred and the manufacturing may be not profitable. Generally, when the container is molded by the hot parison type blow molding method, the preform needs to be demolded from the injection molding mold in a state in which a heat quantity required for the blow molding (heat quantity capable of blow molding (shaping) the preform to a predetermined container shape having required specifications) is left in an inner layer (core layer) of the preform. Further, in the preform molded from a specific biodegradable resin, a temperature zone having the heat quantity suitable for the blow molding is close to a melting temperature of the biodegradable resin, and thus it is necessary to demold the preform at the temperature close to the melting temperature from the injection molding mold. Accordingly, the temperature of the injection molding mold needs to be set high to demold the preform at a high temperature state than that of the normal resin, and as a result, it is found that the preform cannot be sufficiently cooled in an injection molding process and remains at a high temperature, so that inner and outer skin layers (surface layers) of the preform are not sufficiently solidified and are adhered to the injection molding mold in an adhesive manner, the preform cannot be normally demolded, and a upward deformation occurs in the preform. On the contrary, when the preform is molded so as to be sufficiently cooled by the injection molding mold set to a low temperature similar to that of the normal resin (for example, polyethylene terephthalate), the heat quantity required for the blow molding cannot be left in the preform. In addition, in a temperature adjustment process of the hot parison type blow molding method, the temperature of the inner and outer skin layers and the inner layer of the preform is adjusted (cooled) such that an optimal temperature distribution for the blow molding is provided while eliminating an uneven temperature of the preform. However, it is found that when the temperature of the preform of a biodegradable resin is adjusted at the same temperature as that of the normal resin material, the inner and outer skin layers of the preform are cooled and solidified more than necessary, so that when this preform is blow molded and stretched in the blow molding process, the preform may be cracked or the preform may be torn off during stretching by a stretching rod before an introduction of blow air, and the container may not be molded.

An object of the present invention is to provide a manufacturing method for manufacturing a biodegradable resin container and a manufacturing apparatus for manufacturing the same, in which, in a hot parison type blow molding apparatus, a preform can be reliably and easily demolded from an injection molding mold and a temperature can be adjusted such that the preform is not torn off during blow molding.

Solution to Problem

A manufacturing method for manufacturing a biodegradable resin container according to the present invention includes at least: an injection molding process of injection molding a preform (1) made of a biodegradable resin in an injection molding mold; a temperature adjustment process of adjusting a temperature of the preform (1) in a temperature adjustment mold; and a blow molding process of manufacturing a container by blow molding the preform (1) after temperature adjustment in a blow mold, in which a temperature of the injection molding mold is set to 40° C. or lower.

It is preferable that the temperature of the injection molding mold is set to 15° C. to 20° C.

It is preferable that, in the temperature adjustment process, a temperature of inner and outer skin layers of the preform is heated to a heating temperature which is a melting point of the biodegradable resin or close to the melting point.

It is preferable that the heating temperature is 100° C. to 180° C.

It is preferable that, in the temperature adjustment process, a temperature of inner and outer skin layers of the preform is heated to a heating temperature which is a melting point of the biodegradable resin or equal to or higher than the melting point.

It is more preferable that the temperature of the injection molding mold in the injection molding process is 15° C. to 20° C.

It is more preferable that the heating temperature is 100° C. to 230° C.

It is more preferable that the biodegradable resin is a synthetic resin containing polybutylene succinate as a component.

It is more preferable that, in the injection molding process, inner and outer skin layers of the preform are solidified until the inner and outer skin layers are opaque, and, in the temperature adjustment process, the inner and outer skin layers of the preform are heated until the inner and outer skin layers have transparency.

It is more preferable that the temperature adjustment process includes: an inner heating process of heating at least a body portion of the preform from an inner side; and an outer heating process of heating at least the body portion of the preform from an outer side, and a processing time of the outer heating process is longer than a processing time of the inner heating process.

Further, a manufacturing apparatus for manufacturing a biodegradable resin container according to the present invention is a manufacturing apparatus to which any of the above-described manufacturing methods is applied.

ADVANTAGEOUS EFFECTS OF INVENTION

According to the manufacturing method for manufacturing a biodegradable resin container and the manufacturing apparatus for manufacturing the same according to the present invention, by setting the temperature of the injection molding mold to 40° C. or lower, preferably 15° C. to 20° C., the preform of the biodegradable resin material is satisfactorily demolded from the injection molding mold and a upward deformation is prevented. Moreover, by heating the temperature of the inner and outer skin layers of the preform to a melting temperature the same as an inner layer of the preform or a temperature close to the melting temperature in the temperature adjustment process, the preform can be prevented from being cracked or torn off in the subsequent blow molding process. In the present specification, for example, with reference to FIG. 2, an inner peripheral surface 2a of a hollow shape body portion 2 of a preform 1 and a portion in the vicinity of the inner peripheral surface 2a are referred to as an inner skin layer, an outer peripheral surface 2b and a portion in the vicinity of the outer peripheral surface 2b are referred to as an outer skin layer, and an intermediate portion sandwiched between the inner and outer skin layers is referred to as the inner layer (or core layer).

DESCRIPTION OF EMBODIMENTS

Hereinafter, preferred embodiments of the present invention will be described with reference to the drawings.

Figure 1:
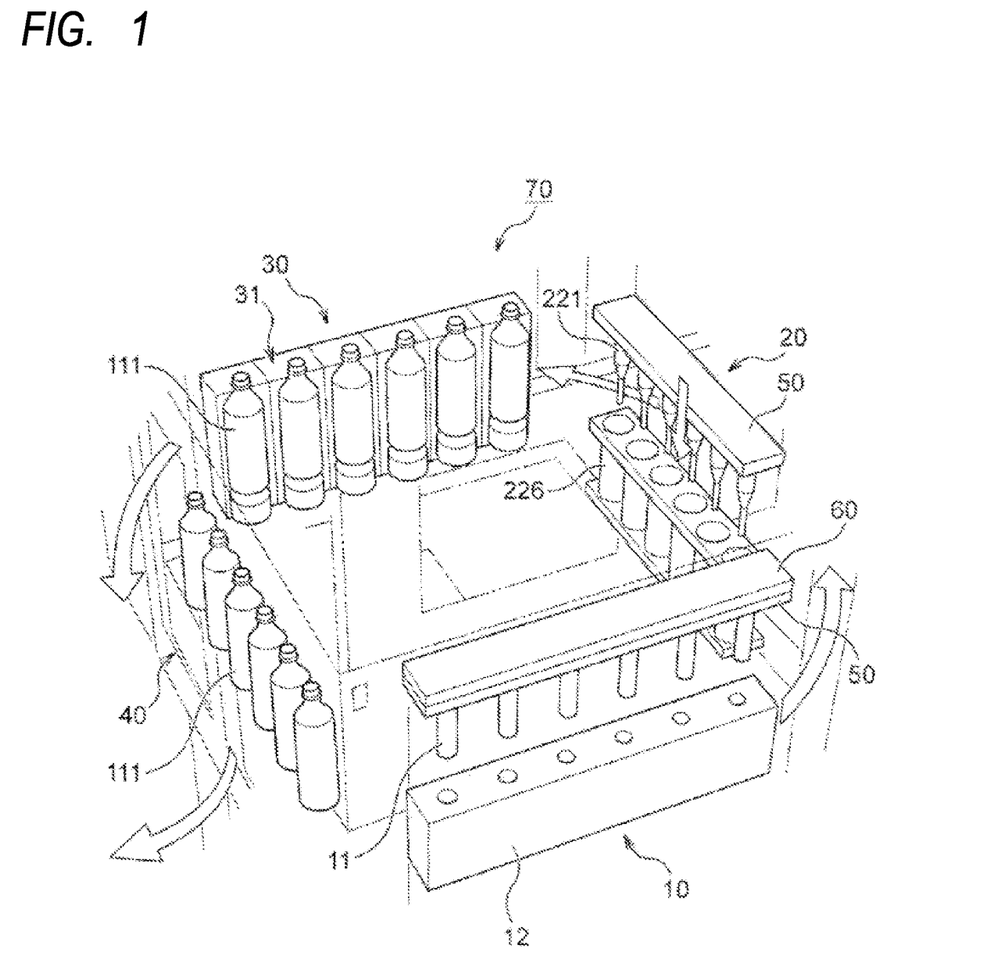
FIG. 1 is a perspective view of a blow molding apparatus to which an embodiment of a manufacturing method for manufacturing a biodegradable resin container according to the present invention is applied.
Figure 2:
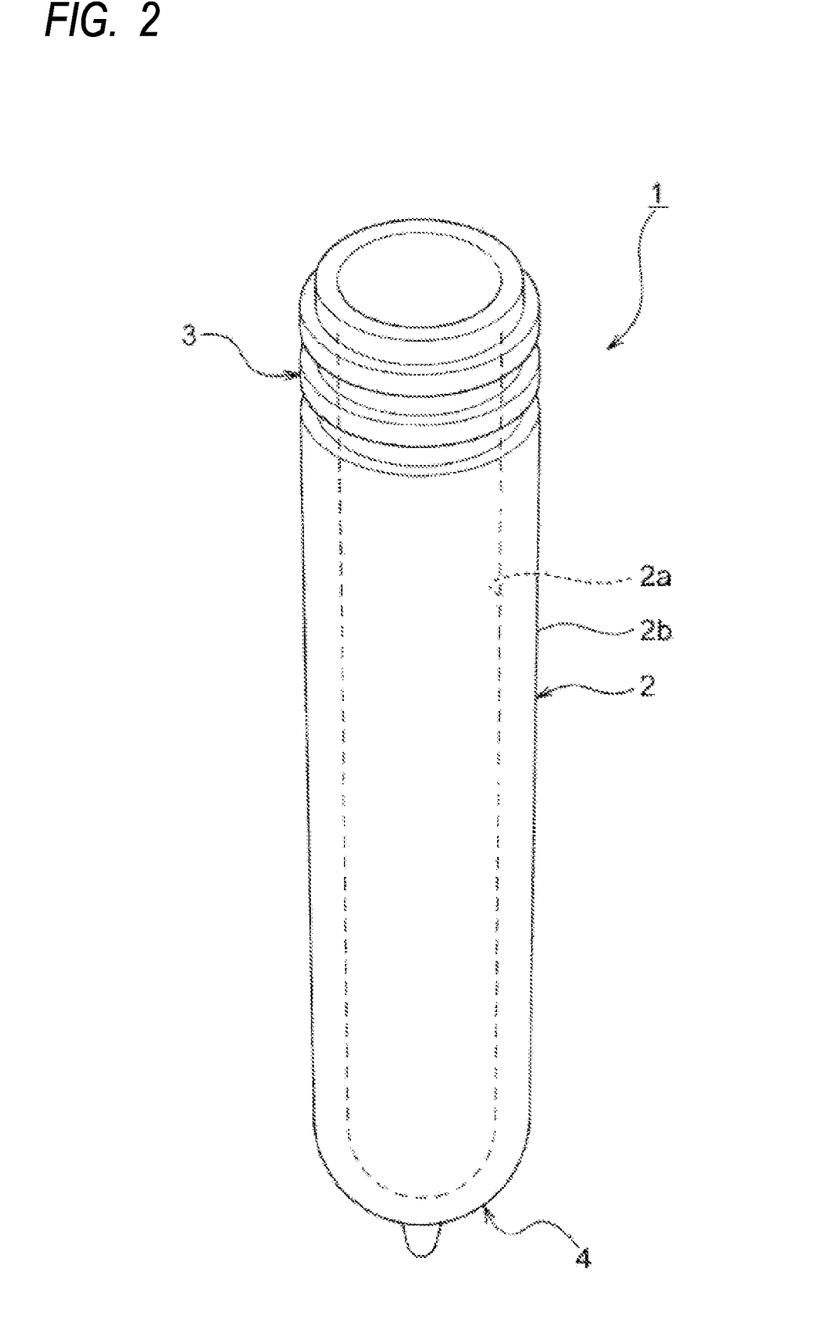
FIG. 2 is a perspective view of an example of a preform injection molded in an injection molding process of the apparatus.

FIG. 1 is a perspective view of a blow molding apparatus to which an embodiment of a manufacturing method for manufacturing a biodegradable resin container according to the present invention is applied, and FIG. 2 is a perspective view of an example of a preform injection molded in an injection molding process of the apparatus.

As shown in FIG. 1, a blow molding apparatus 70 includes an injection molding part 10 that performs the injection molding process of a preform 1, a temperature adjustment part 20 that performs a temperature adjustment process of the preform 1, a blow molding part 30 that performs a blow molding process of manufacturing a container 111 from the preform 1, and a take-out part 40 that performs a take-out process of taking out the container to an outside of a device.

The injection molding part 10, the temperature adjustment part 20, the blow molding part 30, and the take-out part 40 are arranged in an arrangement in which four sides of a square shape are formed thereby when viewed from above. A rotation plate 60 (not shown), which is provided a neck mold 50 (see FIG. 3) that hold a neck portion 3 (see FIG. 2) of the preform 1 molded by the injection molding part 10, is provided above these parts. In the rotation plate 60, four sets of the neck molds 50 are arranged in the arrangement in which the four sides of a square shape are formed thereby when viewed from above. Accordingly, the rotation plate rotates counterclockwise by 90 degrees around a vertical axis above the injection molding part 10, the temperature adjustment part 20, the blow molding part 30, and the take-out part 40, so that each process is performed on the preform 1 held by the neck molds 50.

The injection molding part 10 includes an injection core mold 11, an injection cavity mold 12, and an injection device (not shown), and is provided so as to injection mold the preform 1.

The injection molding part 10 includes an injection core mold 11, an injection cavity mold 12, and an injection device (not shown), and is provided so as to injection mold the preform 1.

As shown in FIG. 2, the preform 1 includes the neck portion 3 on an opened side, a hollow shape body portion 2, and a bottom portion 4 on a closed side and is formed in a bottomed test tube shape. It is desirable that an average thickness of the body portion 2 is set (formed thickly) to be twice or more of an average thickness of the neck portion 3. Further, it is desirable that an average thickness of the bottom portion 4 is set (formed thinly) to ½ (more preferably ⅓) or less of the average thickness of the body portion 2. For example, the average thickness of the body portion 2 may be set to 2.0 mm to 7.0 mm (preferably 2.5 mm to 5.0 mm), and the average thickness of the bottom portion 4 may be set to 0.5 mm to 2.5 mm (preferably 0.8 mm to 1.5 mm). The preform 1 is formed into a finished container 111 (see FIG. 1) by being blow molded. As described above, in the following description, an inner peripheral surface 2a of the hollow shape body portion 2 of the preform 1 and a portion in the vicinity of the inner peripheral surface 2a are referred to as an inner skin layer (or surface layer), an outer peripheral surface 2b and a portion in the vicinity of the outer peripheral surface 2b are referred to as an outer skin layer, and an intermediate portion sandwiched between the inner and outer skin layers is referred to as an inner layer (or core layer).

Figure 3:
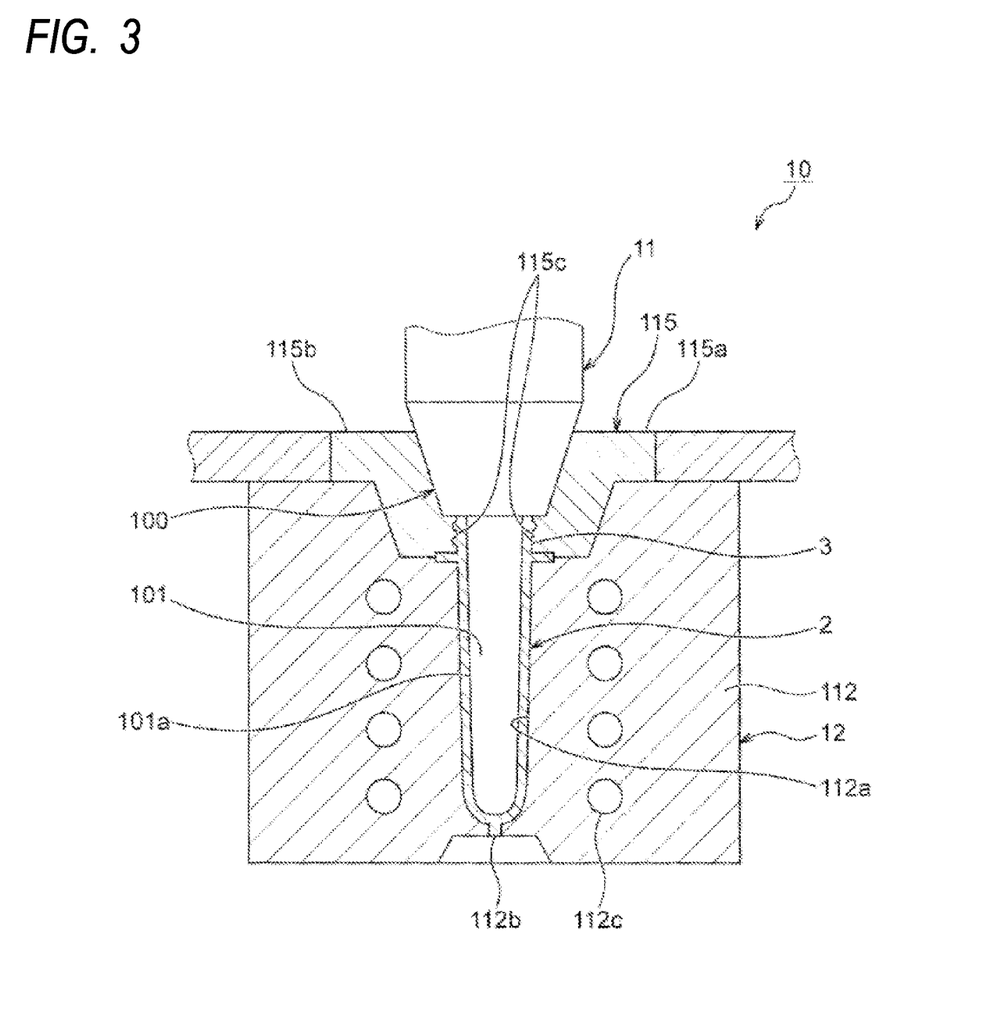
FIG. 3 is a cross-sectional view of an injection molding part of the apparatus.

Next, FIG. 3 shows the injection molding part 10 applied to the manufacturing method for manufacturing a biodegradable resin container according to the present invention. As an example of the biodegradable resin material, it is possible to use a biodegradable plastic containing, as a component, polybutylene succinate (PBS), polyhydroxyalkanoate (PHA, for example, polyhydroxybutyrate), polylacticacid (polylacticacid or polylactide: PLA), or the like. BiOPBS (for example, BiOPBS (registered trademark) manufactured by Mitsubishi Chemical Corporation) contains polybutylene succinate (PBS) as a component, has a property of being naturally decomposed into water and carbon dioxide by power of a microorganism in a soil of a natural world, has high heat resistance in a general biodegradable resin, and has a high compatibility with fibers and the like. Of course, various other biodegradable resin materials may be used in addition to the materials described above. A mold structure of the injection molding part 10 includes an injection core mold 100 and an injection cavity mold body 112 and a lip mold 115 of the injection cavity mold 12.

In the same drawing, the lip mold 115 includes a pair of split molds 115a and 115b which can be opened in a lateral direction in the drawing, and includes a cavity surface 115c that defines an outer wall of the neck portion 3 of the preform 1. The injection cavity mold body 112 includes a cavity surface 112a that defines the outer peripheral surface 2b (see FIG. 2) of the body portion 2 of the preform 1, a molten resin filling gate 112b at a lower end portion, and an internal cooling passage 112c. Accordingly, the biodegradable resin is injected in a molten state (state of the melting point or the temperature (melting temperature) equal to or higher than the melting point, for example, may be 115° C. or higher (for example, about 115° C. to 180° C.) for BioPBS, and may be 100° C. or higher (for example, 100° C. to 230° C.) for other biodegradable resin materials) in a space formed by an outer peripheral surface 101a of a core pin 101 of the injection core mold 100 and the cavity surface 112a of the injection cavity mold 112 and the cavity surface 115c of the lip mold, and the preform 1 is molded by cooling the inner and outer skin layers of the body portion 2 and the bottom portion 4 to a desired temperature described later by a cooling mechanism of the injection core mold 100 and the injection cavity mold 12 (or the injection cavity mold body 112).

The mold structure itself of the injection molding part 10 described above is known, but in the present invention, as will be described later, temperatures of the molds 100, 112, and 115 for injection molding are maintained at 40° C. or lower, which is lower than a set temperature in a normal case in a case of performing extrusion blow molding, the injection molding, or injection blow molding of an article (a container having a cup shape or a bottle shape) made of a biodegradable resin.

Figure 4A:
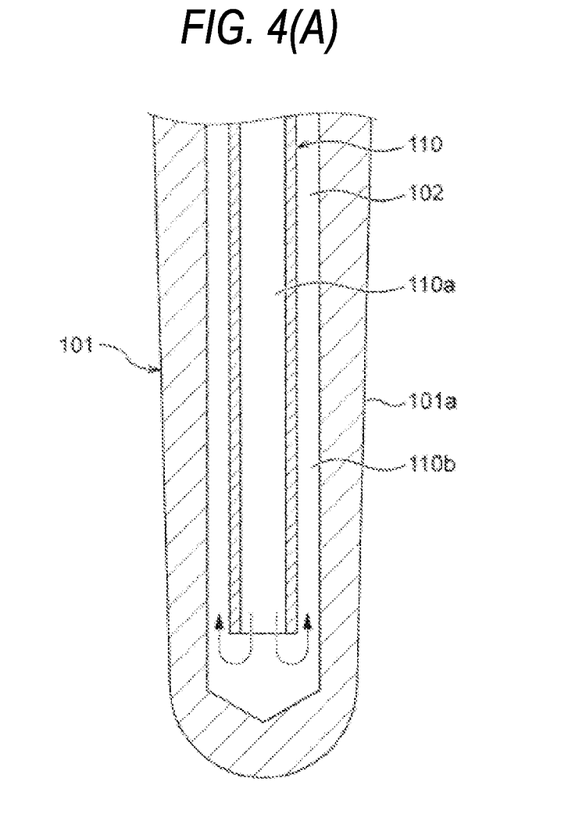
FIG. 4(A) and FIG. 4(B) are a longitudinal sectional view and a transverse sectional view of a core pin portion of the injection molding part of FIG. 3, respectively.
Figure 4B:
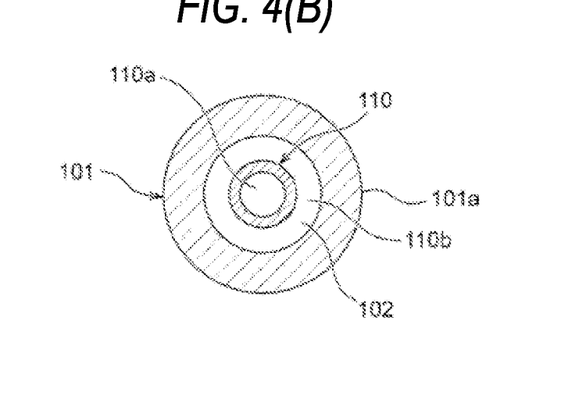

Next, FIGS. 4(A) and FIG. 4(B) show an example of a cooling structure on an injection core mold 100 side. In the same drawing, a hollow portion 102 is formed in an axial direction inside the core pin 101 of the injection core mold 100, and a cooling pipe 110 having an outer diameter smaller than an inner diameter of the hollow portion 102 is inserted. In this way, an inner water passage 110a is formed in a pipe inner portion of the cooling pipe 110, an outer water passage 110b is formed in a pipe outer portion of the cooling pipe, and cold water flows from the inner water passage 110a to the outer water passage 110b in a direction indicated by an arrow in the drawing, so that the core pin 101 is cooled to 40° C. or lower, preferably 15° C. to 20° C., as described above. Also on an injection cavity mold body 112 side, the cold water is passed through the cooling passage 112c, and is cooled to 40° C. or lower, preferably 15° C. to 20° C.

Here, in the injection molding part 10 in the related art, when a normal resin material other than the biodegradable resin, for example, polyethylene terephthalate is used, the temperature of the injection molding mold is set to a low temperature of about 10° C. Therefore, the inner and outer skin layers in a thickness direction of the body portion 2 of the preform at an end time of the injection molding process can be sufficiently cooled and solidified, and the inner layer of the body portion 2 can be set to a predetermined melting temperature (for example, 270° C.) or less and a blow optimum temperature or more or a temperature close to that (for example, 140° C.). Therefore, it is possible to easily demold the preform from the injection molding mold while securing the heat quantity required for the blow molding. In addition, in a case of the resin, since the temperature of the preform suitable for the blow molding is about 100° C. to 120° C., the temperature is slightly reduced (the heat quantity is reduced) while processing required for eliminating an uneven temperature and leveling the temperature of the preform is performed in the temperature adjustment process.

However, according to various experiments, it is found that properties of the biodegradable resin material are significantly different from those of the normal resin material, and when trying to secure the heat quantity required for the blow molding in the preform 1, it was found that it is necessary to demold the preform 1 from the injection molding mold under conditions that the inner layer is at the melting point or the temperature equal to or higher than the melting point of the biodegradable resin (melting temperature), and the inner and outer skin layers are at the melting point or the temperature close to the melting point of the biodegradable resin material (for example, 100° C. to 180° C., preferably 110° C. to 180° C., more preferably 110° C. to 140° C.), or the melting point or the temperature equal to or higher than the melting point (for example, 100° C. to 230° C., preferably 110° C. to 230° C., more preferably 110° C. to 180° C.) to melt surfaces of the inner and outer skin layers and reduce the thickness thereof in consideration of ease of the subsequent blow molding process. The temperature close to the melting point indicates a temperature equal to or lower than the melting point, and is, for example, a temperature within a range of the melting point—15° C. (preferably within a range of the melting point—10° C., more preferably within a range of the melting point—7° C.). Therefore, in summary, in the present specification, the inner layer is heated to the melting point or the temperature equal to or higher than the melting point (melting temperature), the inner and outer skin layers are heated to the melting point or the temperature close to the melting point (for example, 100° C. to 180° C.), and in some cases, the inner and outer skin layers are heated to the melting point or the temperature equal to or higher than the melting point (for example, 100° C. to 230° C.). Therefore, when the preform 1 is molded by setting the temperature of the injection molding mold to a high temperature of about 70° C., it is confirmed that the body portion 2 tends to adhere to the mold (specifically, the injection core mold 11 or the injection cavity mold 12) in an adhesive manner, and the preform 1 cannot be satisfactorily demolded. For example, when the preform 1 is demolded from the injection core mold 11 by raising the injection core mold 11, adhesion between the body portion 2 and the injection core mold 11 is not eliminated, so that upward deformation (take-up deformation) of the body portion 2 frequently occurs (on the other hand, since the neck portion 3 is thinner than the body portion 2, the neck portion 3 is easily affected by a cooling effect from the mold and is solidified even under this condition).

However, in the manufacturing method for manufacturing a biodegradable resin container according to the present invention, based on the above experimental results, both the injection core mold 100 and the injection cavity mold body 112 are cooled to 40° C. or lower, preferably 15° C. to 20° C. by the cold water (chiller water) whose temperature is controlled (set to the low temperature). Therefore, in the preform 1 made of a biodegradable resin that is filled in the space formed by the molds 100, 112, and 115 and is in the molten state, due to thermal conduction with the molds 100 and 112, the inner and outer skin layers of the body portion 2 are rapidly cooled from, for example, about 110° C. to 180° C. in the molten state to, for example, about 50° C. to 90° C. (more preferably 80° C. to 90° C.), and the thickness of the inner and outer skin layers of the body portion 2 is temporarily increased. Accordingly, it is confirmed that the preform 1 (more specifically, the body portion 2) is satisfactorily demolded without being adhered to the molds of the injection molding part 10, that is, the injection core mold 100 and the injection cavity mold body 112 in the adhesive manner, and the upward deformation is also prevented. It is desirable that the preform 1 is cooled and solidified until the inner and outer skin layers of the body portion 2 exhibit a white color (opaque state) in the injection molding process. Further, the average thickness of the bottom portion 4 of the preform 1 may be set to ½ or less of the average thickness of the body portion 2 (formed to be thin) to increase the cooling effect of the bottom portion 4 (particularly, a central portion of the bottom portion 4 in the vicinity of the molten resin filling gate 112*b*), such that the inner and outer skin layers of the bottom portion 4 are solidified so as to be thicker than the inner and outer skin layers of the body portion 2. In this case, it is desirable that the inner and outer skin layers of the bottom portion 4 are also cooled and solidified until the inner and outer skin layers exhibit the white color.

Next, the preform 1 that is injection molded and cooled by the injection molding part 10 and solidified to some extent is lifted upward together with the rotation plate 60 while being held by the neck molds 50, and is pulled out from the injection cavity mold body 112, and as shown in FIG. 1, the preform 1 is conveyed to the temperature adjustment part 20 by rotating the rotation plate by 90 degrees counterclockwise.

Figure 5:
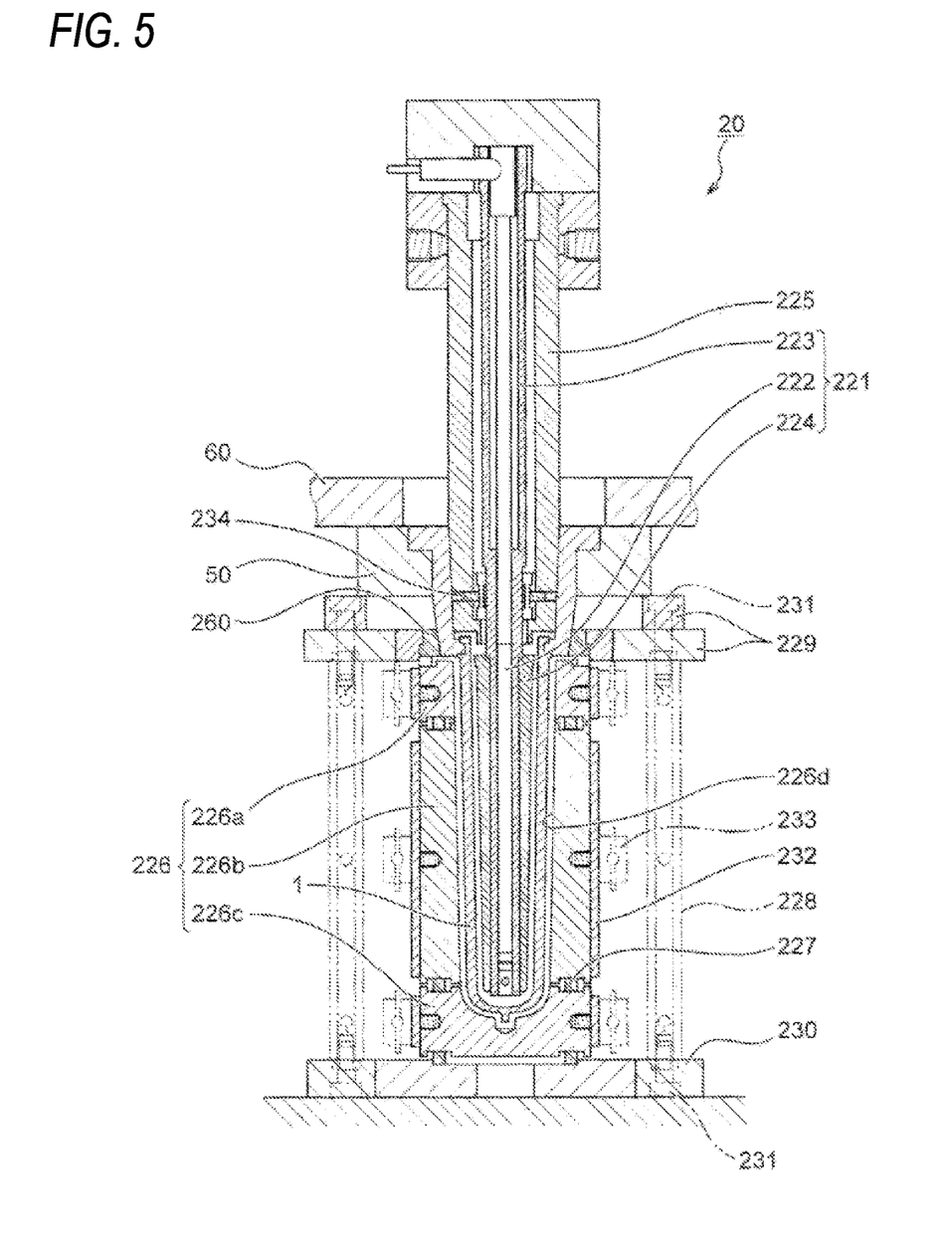
FIG. 5 is a longitudinal sectional view of a temperature adjustment part of the apparatus.

The temperature adjustment part 20 is arranged next to the injection molding part 10 and includes a heating rod mold 221 at an upper side and a heating pot mold 226 at a lower side as shown in FIG. 5. The heating rod mold 221 performs a process (inside heating process) of being inserted into the body portion 2 (hollow portion) of the preform 1 and heating at least the body portion 2 of the preform 1 from an inner side, and the heating pot mold 226 performs a process (outer heating process) of accommodating the preform 1 therein and heating at least the body portion 2 of the preform 1 from an outer side. Here, as necessary, in the inner heating process and the outer heating process, the inner peripheral surface and the outer peripheral surface of the bottom portion 4 may be heated (for example, in a case where the inner and outer skin layers of the bottom portion 4 are excessively solidified in the injection molding process, or in a case where inner and outer surfaces of the bottom portion 4 where a stretching rod is not substantially in contact in consideration of a shaping property are intended to be heated).

The heating rod mold 221 includes a rod-shaped first heater 222 disposed at a center (actually, only a lower half portion in the drawing facing the heating pot mold 226 is a heater portion), a sleeve 223 that fits to and fixes the heater 222, and a heating core sleeve 224 fitted to the sleeve 223. The heating rod mold 221 is housed in a core housing 225 and fixed by a locking member (locking screw) 234. The heating rod mold 221 is driven to move up and down via the core housing 225. In the heating pot mold 226, for example, three cross-sectional ring-shaped pot molds 226*a*, 226*b*, and 226*c* stacked via heat insulating materials 227 are housed in the housing 228, and are tightened and fixed between upper and lower fixing plates 229 and 230 by fixing members (bolts or the like) 231. The heating pot mold 226 includes a cavity 226*d* and includes a band-shaped second heater 232 provided so as to cover an outer periphery of the heating pot mold 226. Reference numeral 233 indicates second heater fixing members for winding and fixing the second heater 232. The heating pot mold 226 is driven to move up and down via the fixing plate 230.

Next, an operation of the temperature adjustment part 20 handling the preform 1 molded from the biodegradable resin material will be described. As shown in FIG. 5, with respect to the preform 1 which is conveyed from the injection molding part 10 to the temperature adjustment part 20 and is stationary by gripping the neck portion 3 with the neck molds 50, the heating pot mold 226 rises to accommodate the preform 1 in the cavity 226*d*, and the heating rod mold 221 descends to be inserted into the preform 1. At this time, the neck molds 50 are centered with respect to a centering ring 260 attached on the heating pot mold 226. A gap having an appropriate dimension is formed between the inner peripheral surface 2a (see FIG. 2) of the preform 1 and the outer peripheral surface of the heating core sleeve 224, and between the outer peripheral surface 2b (see FIG. 2) of the preform 1 and the inner peripheral surface of the cavity 226d of the heating pot mold 226, respectively. Here, when the preform 1 conveyed from the injection molding part 10 is the normal resin material in the related art, in this temperature adjustment process, the temperature of the inner and outer skin layers of the body portion 2 of the preform is generally adjusted so as to be cooled or maintained at a predetermined temperature. However, according to the various experiments, it is confirmed that even when the inner and outer skin layers of the body portion 2 of the preform 1 molded from the biodegradable resin are processed in the same manner as in the case of the normal resin in the temperature adjustment process, a cooled solidification state is not eliminated, and the preform is torn off during stretching by the stretching rod in the subsequent blow molding process and cannot be molded into the container.

Therefore, in the present invention, as shown in FIG. 5, in the preform 1 made of a biodegradable resin conveyed to the temperature adjustment part 20, the heating rod mold 221 is arranged inside the preform 1, and the heating pot mold 226 is arranged outside the preform 1. At this point, the inner layer in the thickness direction of the body portion 2 of the preform 1 of the biodegradable resin material remains melted and is at the temperature equal to or higher than the melting point (melting temperature), but the inner and outer skin layers in the thickness direction of the body portion 2 are cooled by the molds 11 and 112 at the low temperature of the injection molding part 10 in the previous process as described above to be, for example, about 50° C. to 90° C. (more preferably 80 to 90° C.) and exhibit the white color (opaque state). When the preform 1 made of a biodegradable resin in which the inner and outer skin layers are in a low temperature state is sent to the blow molding process as it is, the preform 1 may be torn off as described above. However, in the present invention, the first heater 222 and the second heater 232 in the temperature adjustment process are electrically heated to a high temperature of, for example, about 245° C. Therefore, heat of the heaters 222 and 232 is transmitted to the preform 1 in a short time through the heater sleeve 223 and the heating pot mold 226, and the inner and outer skin layers of the body portion 2 of the preform 1 are radiatively heated via the gaps. Accordingly, the temperature of the inner and outer skin layers of the body portion 2 of the preform 1 is heated from about 50° C. to 90° C. (more preferably from 80° C. to 90° C.) described above to a temperature close to the inner layer in the molten state, specifically, the melting point or the temperature close to the melting point of the biodegradable resin material (for example, 110° C. to 140° C.), or the melting point or the temperature equal to or higher than the melting point (for example, 110° C. to 180° C.). Accordingly, the body portion 2 of the preform 1 is changed from the white color (opaque state) to a state having transparency (a state in which the transparency is increased than that at a time of demolding in the injection molding process, and may be yellowish in the state in which the transparency is increased), the temperature of the inner and outer skin layers is increased to reduce the thickness of the inner and outer skin layers formed in the injection molding process, a high solidification state (curing state) is eliminated, and the state is in a softened state. At the same time, in addition to the inner layer, the inner and outer skin layers are set to the melting point or the temperature close to the melting point of the biodegradable resin material, which is the blow optimum temperature, or the melting point or the temperature equal to or higher than the melting point (in a high temperature state immediately before drawdown).

Subsequently, the preform 1 is conveyed to the blow molding part 30 by the neck molds 50, is accommodated in a blow mold 31 including the pair of split molds, and then is blow molded by the stretching rod and compressed air having a predetermined pressure (for example, 0.3 MPa to 2.0 MPa). At this time, since the preform 1 is in a substantially molten state together with both the inner layer and the inner and outer skin layers of the body portion 2, even though the preform 1 is the biodegradable resin, the preform 1 is satisfactorily blow stretch molded without being cracked or torn off when stretched by the stretching rod, and the biodegradable resin container can be satisfactorily manufactured. Further, when the average thickness of the bottom portion 4 of the preform 1 is set to ½ or less of the average thickness of the body portion 2 and the bottom portion 4 is sufficiently solidified in the injection molding process, it is possible to reliably prevent the bottom portion 4 from breaking (piercing) by the stretching rod at a time of stretching the preform 1. Further, the preform 1 may be blow molded into the container 111 by introducing primary air having a low pressure (for example, 0.3 MPa to 0.5 MPa) into the preform 1 at a slow flow rate (for example, 200 L/min (ANR) or less) to slowly and slightly inflate the preform 1 before the stretching rod comes into contact with the preform 1, and then performing the stretching by the stretching rod and an introduction of secondary air having a high pressure (for example, 0.6 MPa to 3.5 MPa). Accordingly, a burst defect that is likely to occur when the preform 1 is blow molded can be reduced.

In the above embodiment, both the first heater 222 and the second heater 232 are electrically heated, but the present invention is not limited to this, and the temperature of gas combustion heating may be transmitted. When the preform 1 is conveyed from the injection molding part 10 to the temperature adjustment part 20, the outer peripheral surface 2b of the body portion 2 is cooled more strongly than the inner peripheral surface 2a by natural cooling, and the outer skin layer tends to be solidified more thickly than the inner skin layer. Therefore, it is desirable that in the temperature adjustment process, a processing time (heating time) of the outer heating process is longer than a processing time of the inner heating process. For example, it is preferable that the processing time of the outer heating process is 8 to 20 seconds and the processing time of the inner heating process is 4 to 6 seconds, such that the time of the outer heating process is twice or more the time of the inner heating process. Alternatively, the processing time of the outer heating process and the processing time of the inner heating process may be substantially the same, and a heating intensity of the outer heating process (output of the second heater) may be higher than a heating intensity of the inner heating process (output of the first heater).

Further, the inner and outer skin layers of the preform 1 made of the biodegradable plastic at the low temperature in the injection molding part 10 are made to have a high temperature by the temperature adjustment part 20, so that a biodegradable container can be satisfactorily manufactured. Therefore, the present invention can be suitably carried out only by the hot parison type blow molding apparatus 70 provided with the temperature adjustment part (a hot parison type blow molding method including the temperature adjustment process).

The present invention is not limited to the above embodiment, and various improvements and design modifications may be made without departing from the spirit of the present invention.

For example, instead of the synthetic resin (biodegradable plastic) having high biodegradability, the synthetic resin (biomass plastic) having low biodegradability but low environmental load may be used. As the biomass plastic, biomass-derived polyethylene (biopolyethylene: BioPE, Bio-Polyethylene) or the like can be used. Since the blow optimum temperature of a biopolyethylene preform is also close to the melting point (for example, 120° C. to 140° C.), the above injection molding process and the temperature adjustment process are effective. That is, in the present invention, even when the material is a bioplastic (generic name of the biodegradable plastic and the biomass plastic), by performing the above manufacturing method (the injection molding process or the temperature adjustment process), the preform made of a bioplastic can be satisfactorily demolded from the injection molding mold in the injection molding process, the preform can be prevented from being torn off or the like in the blow molding process, and a container made of a bioplastic can be satisfactorily manufactured (blow molded).

In addition, it is to be understood that the embodiments disclosed herein are illustrative and non-restrictive in every respect. The scope of the present invention is defined not by the above description but by the scope of the claims, and is intended to include all modifications within the meaning and scope equivalent to the scope of the claims.

REFERENCE SIGNS LIST

1 . . . preform
2 . . . body portion of preform
2a . . . inner peripheral surface
2b . . . outer peripheral surface
3 . . . neck portion
4 . . . bottom portion
10 . . . injection molding part
11 . . . injection core mold
12 . . . injection cavity mold
20 . . . temperature adjustment part
30 . . . blow molding part
31 . . . blow mold
40 . . . take-out part
50 . . . neck mold
70 . . . blow molding apparatus
100 . . . injection core mold
101 . . . core pin
101a . . . outer peripheral surface of core pin
102 . . . hollow portion
110 . . . cooling pipe
110a . . . inner water passage
110b . . . outer water passage
111 . . . finished container
112 . . . injection cavity mold body
112a . . . cavity surface
112b . . . molten resin filling gate
112c . . . cooling passage
115 . . . lip mold
115a,115b . . . split mold
115c . . . cavity surface
221 . . . heating rod mold
222 . . . first heater
223 . . . sleeve
224 . . . heating core sleeve
225 . . . core housing
226(226a, 226b, 226c) . . . heating pot mold
226d . . . pot cavity
227 . . . heat insulating material
228 . . . housing
229,230 . . . fixing plate
231 . . . fixing member
232 . . . second heater
233 . . . pot heater fixing member
234 . . . locking member

The invention claimed is:

1. A manufacturing method for manufacturing a biodegradable resin container, the manufacturing method comprising at least:
    an injection molding process of injection molding a preform made of a biodegradable resin in an injection molding mold;
    a temperature adjustment process of adjusting a temperature of the preform in a temperature adjustment mold; and
    a blow molding process of manufacturing the biodegradable resin container by blow molding the preform after temperature adjustment in a blow mold,
    wherein a temperature of the injection molding mold is set to 40° C. or lower,
    wherein, in the injection molding process, inner and outer skin layers of the preform are solidified until the inner and outer skin layers are opaque,
    wherein, in the temperature adjustment process, the inner and outer skin layers of the preform are heated until the inner and outer skin layers have transparency,
wherein the biodegradable resin is a biodegradable plastic including, as a component, a material selected from the group consisting of polybutylene succinate, polyhdroxyalkanoate, polyhydroxybutyrate, polylacticacid, and polylactide,
wherein, in the temperature adjustment process, a temperature of inner and outer skin layers of the preform is heated to a heating temperature which is a melting point of the biodegradable resin or within 15° C. below the melting point, wherein the temperature adjustment process includes:
an inner heating process of heating at least a body portion of the preform from an inner side; and
an outer heating process of heating at least the body portion of the preform from an outer side, and wherein a processing time of the outer heating process is longer than a processing time of the inner heating process.

2. The manufacturing method according to claim 1, wherein the temperature of the injection molding mold is set to 15° C. to 20° C.

3. The manufacturing method according to claim 1, wherein the temperature of the injection molding mold in the injection molding process is 15° C. to 20° C.

4. The manufacturing method according to claim 1, wherein the heating temperature is 100° C. to 230° C.

5. The manufacturing method according to claim 1, wherein an average thickness of a body portion of the preform is between 2.0 mm to 7.0 mm.

6. The manufacturing method according to claim 1, wherein an average thickness of a bottom portion of the preform is between 0.5 mm to 2.5 mm.

7. The manufacturing method according to claim 1,
wherein the injection molding mold includes an injection core mold and an injection cavity mold, and
wherein both the injection core mold and the injection cavity mold are both cooled to 40° C. or lower.

8. The manufacturing method according to claim 1,
wherein the injection molding mold includes an injection core mold and an injection cavity mold, and
wherein both the injection core mold and the injection cavity mold are both cooled to between 15° C. and 20° C.

9. The manufacturing method according to claim 7,
wherein the injection core mold includes a core pin with a hollow portion formed in an axial direction inside of the core pin,
wherein a cooling pipe is provided inside of the hollow portion, in which the cooling pipe includes an inner water passage formed in a pipe inner portion of the cooling pipe, and an outer water passage formed in a pipe outer portion of the cooling pipe, and
wherein water flows through the inner water passage to the outer water passage to cool the core pin to 40° C. or lower.

10. The manufacturing method according to claim 7,
wherein the injection core mold includes a core pin with a hollow portion formed in an axial direction inside of the core pin,
wherein a cooling pipe is provided inside of the hollow portion, in which the cooling pipe includes an inner water passage formed in a pipe inner portion of the cooling pipe, and an outer water passage formed in a pipe outer portion of the cooling pipe, and
wherein water flows through the inner water passage to the outer water passage to cool the core pin to between 15° C. and 20° C.

* * * * *